United States Patent Office 3,537,997
Patented Nov. 3, 1970

3,537,997
METHYL ALKYL SILICONE GREASE COMPOSITION AND METHOD OF MAKING SAME
John H. Wright, Elnora, N.Y., assignor to General Electric Company, a corporation of New York
No Drawing. Filed Sept. 16, 1968, Ser. No. 762,322
Int. Cl. C10m 7/48
U.S. Cl. 252—42.1        5 Claims

ABSTRACT OF THE DISCLOSURE

A grease composition contains a polysiloxane, the organic substituents of which are primarily methyl radicals and $C_6$ to $C_{12}$ alkyl radicals, a thickener, optionally an amount of a polyether which is sufficient to cause the thickener to disperse into the polysiloxane, but insufficient to deleteriously affect the high temperature properties of the grease, and optionally a sufficient amount of a base to render the grease alkaline. The grease is made by heating together the polysiloxane, the polyether, the thickener and the base to a temperature of about 400–500° F., after which the grease composition is cooled to room temperature, then milled. The grease composition is used in windshield wiper bearings and drive mechanisms, which are subject to oscillatory motion, often while being flooded with water.

This invention relates to improved methylalkylpolysiloxane grease compositions. More particularly, the present invention is concerned with organopolysiloxane grease compositions, 25 percent to 50 percent of the organic substituents of which are alkyl radicals having 6 to 12 carbon atoms.

Organopolysiloxane greases and grease compositions are well known in the art and have been used as lubricants, dielectric compounds, sealing compounds and high vacuum greases. These organopolysiloxane greases have been particularly valuable because of their high degree of heat stability, their water repellency, their low temperature viscosity characteristics and dielectric properties. In many other applications, these greases are employed in high temperature operations. While the polysiloxane components in the grease are not broken down by oscillatory or fluttering motion, it has been found that where the greases have been employed in bearings subject to oscillatory or fluttering motion, the film formed by the greases ruptured and allowed metal to metal contact. This problem has been even more particularly acute when petroleum based greases were used to lubricate bearings subject to oscillatory or fluttering motion.

To solve this problem of film breakdown in silicone greases, it has been found that when alkyl groups used in bearings subject to oscillatory or fluttering motion containing from 6 to 12 carbon atoms were used as from 25% to 50% of the total number of radicals on the polysiloxane used in a grease, that the film formed by the grease, when subjected to low speed oscillatory motion or fluttering motion of the lubricated surfaces, did not rupture. It is theorized, that the long chain alkyl substituents resulted in a bulking of the film thus preventing metal to metal contact.

It is an object of the present invention to provide improved organopolysiloxane grease compositions which retain most of the beneficial properties of heretofore known polysiloxane grease compositions and which, in addition, maintain a good lubricating film boundary when subjected to low speed oscillatory or fluttering motion of the lubricated surfaces.

This and other objects of my invention are accomplished by an improved methylalkylpolysiloxane grease composition, the alkyl groups of which contain from 6 to 12 carbon atoms. It has been found that when from 25% to 50% of the total number of substituents on a polysiloxane used in a methylalkylpolysiloxane grease composition are alkyl groups containing from 6 to 12 carbon atoms, that the grease provides markedly improved lubrication when used between metal surfaces which undergo oscillatory or fluttering motion. Such a methylalkylpolysiloxane grease is particularly useful in low speed, low load applications.

The grease compositions of the present invention comprise, on a weight basis:

(1) From 61% to 98% of a polysiloxane fluid containing as the organic substituents 50% to 75%, based upon the total number of organic substituents, silicon-bonded methyl groups and from 25% to 50% of alkyl groups containing from 6 to 12 carbon atoms, preferably 10 carbon atoms;

(2) From 2% to 35% of a thickener, preferably a lithium soap of a higher fatty acid having from 12 to 22 carbon atoms such as a lithium soap of lauric, myristic, palmitic or stearic acid, preferably myristic or stearic acid;

(3) Optionally from 0.01 to 5.0 percent of a polyether, and preferably from 0.1 to 2.0% of a polyether;

(4) Optionally a base such as lithium hydroxide in an amount sufficient to maintain the grease on the alkaline side.

The fluid methylalkylpolysiloxanes employed in the practice of the present invention are well known in the art. This type of methylalkylpolysiloxane can be characterized as having the average formula of:

(1) 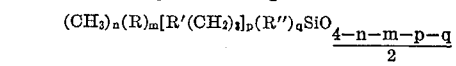

The sum of $(m+n+p+q)$ has a value of from 2.002 to 3.0; $n$ has a value of from .50 to 1.95; $m$ has a value of from .50 to 1.00; $p$ has a value of from 0 to .5; $q$ has a value of from 0 to 0.5; $q$ has a value of from 0 to $\frac{1}{4}(m+n+p)$; R is an alkyl radical containing from 6 to 12 carbon atoms, e.g., hexyl, octyl, decyl, dodecyl, etc. radicals; and R′ is a t-butyl-substituted hydroxyaryl radical and has the formula:

(2) 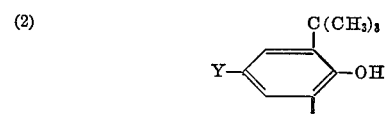

where Y is a member selected from the class consisting of hydrogen, monovalent hydrocarbon radicals, hydroxyaryl radicals, hydroxyaryl-substituted monovalent hydrocarbon radicals, hydroxyaryl ethers joined to the t-butyl-substituted hydroxyaryl radical through the ether linkage, hydroxyarylthioethers joined to the t-butyl-substituted hydroxyaryl radical through the thioether linkage and hydroxyarylmethylene ethers joined to the t-butyl-substituted hydroxyaryl radical through the methylene ether linkage; R″ is selected from the class consisting of lower alkyl radicals having one to 5 carbon atoms, e.g., methyl, ethyl, propyl, butyl, pentyl, etc. radicals; having 5 to 7 carbon atoms in the ring, e.g., cyclopentyl, cyclohexyl, cycloheptyl, etc. radicals; mononuclear and binuclear aryl radicals, e.g., phenyl, naphthyl, biphenyl, etc. radicals; mononuclear aryl lower alkyl radicals, e.g., benzyl, tolyl, xylyl, phenylethyl, etc. radicals and halogenated derivatives of the above radicals.

Other groups represented by R″ above may be present as radicals attached to siloxane units without deleteriously affecting the film forming properties of the grease. It is preferred that not more than 25% of the total number of radicals present on the polysiloxane consist of these other radicals. Although any methylalkylpolysiloxane fluid within the scope of Formula 1 is applicable in the process of the present invention, it is preferred that the fluid have a viscosity of from about 10 centistokes to about 100,000 centistokes when measured at 25° C.

It should be understood that the methylalkylpolysiloxane fluids of Formula 1 can include siloxane units of varied types and formulation such as trimethylsiloxane units and methylalkylsiloxane units alone or in combination with units such as monomethylsiloxane units, monoalkylsiloxane units, dialkylsiloxane units, trialkylsiloxane units, etc. The only requirement is that the ratio of the various siloxane units employed be selected so that the average composition of the copolymeric fluid is within the scope of Formula 1.

One component of the grease compositions of the present invention are the grease thickening agents which are well known in the art. This invention contemplates the use of any of these well known thickening agents to form a grease composition of the desired consistency. The term "grease" as employed in the present application is intended to refer to grease-like materials which may have consistencies varying from readily flowable materials to materials which exhibit almost no flow. The consistency of the greases of the present invention depend on the amount of thickening agent employed, the type of thickening agent employed and the particular polysiloxane fluids in the grease. Examples of suitable thickening agents include the metallic soaps of fatty acids of at least 8 carbon atoms where the metals in such soaps include aluminum, lead, zinc, manganese, lithium, sodium, potassium, calcium, barium, strontium, copper, mercury, bismuth, chromium, iron, cobalt, nickel, etc. The use of many of such metal soaps are disclosed in U.S. Pats. 2,456,642 and 2,599,984. Metallic soaps of shorter chain length fatty acids such as acids containing from 2 to 6 carbon atoms as well as hydroxy-substituted fatty acids and hydroxy-substituted fatty acid glycerides such as are disclosed in Pats. 2,551,931 and 2,508,741 may also be employed as thickening agents.

Other specific metallic soaps which can be used as thickening agents in the practice of the present invention include lithium-2-ethylhexoate, lithium hydroxy stearate, lithium myristate and lithium caprate.

In addition to metal soaps, the compositions of the present invention may employ as grease thickening agents finely divided inert oxides of metallic and quasi-metallic materials such as silica, alumina, iron oxide, titania, zinc oxides, glass fibers and clays. Silica, when used as a thickening agent, is preferably employed as an aerogel, but may also be employed as fumed silica, precipitated silica, or silica derived from natural deposits such as diatomaceous earth.

In addition to the relatively simple thickening agents described above, the invention of the present application contemplates the use of complex metal soaps such as aluminum benzoate stearate as described in Pat. 2,599,-553, acyl ureas such as octadecanoyl urea as described in Pat. 2,698,300 and the phenylenediamides such as N,N-acetylstearoyl-p-phenylenediamides as described in Pat. 2,709,157. In addition, a particularly useful group of thickening agents are the aromatic substituted ureas which are commonly referred to as ASU thickeners. The most useful thickeners are the lithium soaps of any of the higher fatty acids having from 12 to 22 non-carboxyl carbon atoms. Another suitable thickening agent is phthalocyanine. Other thickeners include carbon blacks, graphite and polyethylene.

The term grease as employed in the present application is intended to refer to grease-like materials which may have consistencies varying from readily flowable materials to materials which exhibit essentially no flow. The consistency of the greases of the present invention depend on the amount of thickening agent employed, the particular thickening agent employed and the particular polysiloxane fluids in the grease. The most useful thickening agents are the lithium soaps of higher fatty acids of 12 to 22 noncarboxyl carbon atoms such as lauric, palmitic, and most preferably the lithium soaps of myristic and stearic acids.

While, as explained above, the amounts of thickening agent employed in the grease compositions of the present invention are not critical and may vary within wide limits depending on the particular consistency desired in the final product, it has been found that the amount of thickening agent usually varies from about 2 percent to 35 percent and preferably from about 5 percent to 25 percent by weight based on the weight of the polysiloxane in the grease composition. One critical feature, however, of the grease composition of the present invention is that from 25 to 50 percent of the total number of organic substituents on the polysiloxane must be selected from the class consisting of alkyl radicals having from 6 to 12 carbon atoms and preferably 10 carbon atoms. The radicals may be straight chain or branched chain radicals, e.g., hexyl, isoheptyl, octyl, decyl, isodecyl, dodecyl, etc. radicals.

For improved ease of dispersion of the thickening agent in the polysiloxane, it is preferable that a polyether be present in an amount equal to from about 0.01 to 5.0 percent by weight based upon the weight of the polysiloxane fluids in the compositions, and preferably from 0.1 to 2.0 percent by weight. When less than 0.01 percent by weight of the polyether is present, it is found that it is difficult to disperse the thickening agent into the grease. When the amount of polyether in the grease composition is in excess of 5.0 percent by weight, it is found that the weight loss of the grease at temperatures in excess of 300° F. is so excessive that the grease is unsuitable for use in many applications.

The polyethers which are used herein in combination with the polysiloxane oils according to this invention are polymeric alkylene oxides and/or polymeric alkylene glycols, and may be represented by the following formulas:

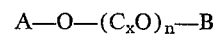

and

wherein A and B represent radicals selected from the class comprising hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms; A and B also represent ester forming groups containing from 2 to 12 carbon atoms; A and B may or may not be alike. When there is more than one A radical per molecule, the A radicals may or may not be the same. Q is a residue of a polyhydric initiator radical containing at least two hydroxyl radicals such as ethylene glycol, glycerol, trimethylolpropane, and other polyhydric alcohols having from 2 to 6 hydroxyl groups; $x$ is a number having a value of 2 to 4; $n$ is a number having a value of from 4 to 2000 and $y$ has a value of from 2 to 6 and $z$ has a value of one to 5.

More specifically, A and B represent radicals selected from the class comprising hydrogen; alkyl radicals having from 1 to 12 carbon atoms, e.g., methyl, ethyl, propyl, butyl, octyl, etc. radicals; cycloalkyl radicals having 5 to 7 carbon atoms in the ring, e.g., cyclopentyl, cyclohexyl, cycloheptyl, etc. radicals; mononuclear and binuclear aryl radicals, e.g., phenyl, naphthyl, biphenyl, etc. radicals; mononuclear aryl lower alkyl radicals wherein the alkyl groups attached to the aromatic nucleus contain a total of no more than 5 carbon atoms, e.g., benzyl, phenylethyl, phenylpropyl, etc.; and ester groups having from 1 to 12 non-carboxyl carbon atoms such as the residues formed by the removal of a carboxyl hydrogen from a fatty acid, e.g., an acetate, propionate, octoate, etc.; hydroxyether groups derived from glycols such as butylene glycol, octylene glycol, etc.; and groups formed by esterification with a hydroxyl group of a non-fatty acid, e.g., propyl phosphate, octyl sulfonate, butyl sulfate, etc.

The polyethers may be prepared from the various alkylene oxides (e.g., ethylene oxide), the higher 1,2-epoxides (such as 1, 2-propylene oxide), the alkylene glycols (e.g., ethylene glycol) and mixtures of these. The resulting products may be polyoxyalkylene diols or polyalkylene glycol derivatives; that is, the terminal hydroxyl groups can remain as such, or one or both of the terminal hydroxyl groups can be removed during the polymerization reaction or subsequent thereto, as by etherification or esterification to yield mono- or di-ether or mon- or di-ester groups or a combination of such terminal groups whereby certain desirable properties are imparted to the final polymeric mixtures. For example, in the above formula A and/or B may be: alkyl radicals, forming a dialkyl polyether (e.g., dibutyl heptaoxypropylene diether); ester forming radicals, forming alkyl oxyalkylene esters (e.g., butyl pentaoxypropylene acetate); hydrogen, forming polyglycols (e.g., polyethylene glycol), etc.

To further exemplify the polyethers which can be used, the polyether oil, that is, the —$(C_xO)_n$— section of the above formula, can be derived from such basic units as the following oxides:

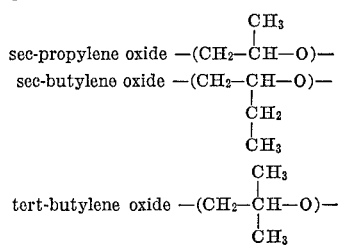

or basic units obtained by the dehydration of alkylene glycols, resulting in the formation of the following:

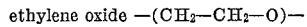
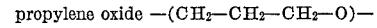
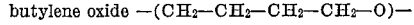

etc.

Polyethers containing combinations of the above described basic units have been found to be quite useful in the practice of the present invention. A composition containing two different alkylene oxide groups can be prepared, for example, by reacting a polypropylene glycol with ethylene oxide in the presence of boron trifluoride. This mixed polyalkylene glycol, if desired, can then be reacted with an alkanol such as butanol to form the monobutoxyether of the mixed polyalkylene glycol. A number of these polyalkylene oxide materials are commercially available including the materials sold under the trade name "Ucon" by Union Carbide Corporation, and the materials sold under the name of "Pluracol" by the Wyandotte Chemicals Corporation.

The molecular weight of the polyether oils used according to this invention can range from 300 to 200,000, from 400 to 20,000 being preferred.

In the preferred embodiment of my invention an antioxidant which is built into the polysiloxane molecule is used. This antioxidant is represented by the R' radical of Formula 1 which is a t-butyl-substituted hydroxyaryl radical and has the formula:

(2)
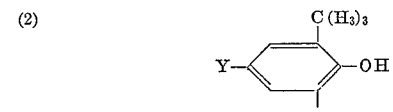

where Y is a member selected from the class consisting hydrogen, monovalent hydrocarbon radicals, hydroxyaryl radicals, hydroxyaryl-substituted monovalent hydrocarbon radicals, hydroxyaryl ethers joined to the t-butyl-substituted hydroxyaryl radical through the ether linkage, hydroxyaryl-thioethers joined to the t-butyl-substituted hydroxyaryl radical through the thioether linkage and hydroxyarylmethylene ethers joined to the t-butyl-substituted hydroxyaryl radical through the methylene ether linkage. As is seen from Formulas 1 and 2, the R' radical has a valence bond attached to the aromatic nucleus and to a divalent propylene radical which, in turn, is attached to a silicon atom of the polysiloxane. In the ortho position with respect to this valence bond is a hydroxy radical and in the meta position is a tertiary butyl radical. In the other meta position is the Y radical previously described. The t-butyl groups is adjacent to the hydroxyl group and hinders its reactivity. Thus, the hydroxyaryl radical is a hindered hydroxyaryl radical.

Among the monovalent hydrocarbon radicals free of aliphatic unsaturation represented by Y in Formula 2 are, for example, alkyl radicals, e.g., methyl, ethyl, propyl, butyl, octyl, etc. radicals; aryl radicals, e.g., phenyl, naphthyl, etc. radicals; aryl lower alkyl radicals, e.g., benzyl, phenylethyl, etc. radicals. Among the hydroxyaryl radicals represented by Y of Formula 2 are, for example, p-hydroxyphenyl, o,o-di(t-butyl)-p-hydroxyphenyl, o-(t-butyl) o-allyl-p-hydroxyphenyl, etc. radicals. Illustrative of the hydroxyaryl-substituted monovalent hydrocarbon radicals within the definition of Y of Formula 2 are, for example, p-hydroxyphenylmethyl radicals, o,o-di(t-butyl) - p-hydroxyphenylethyl radicals. Illustrative of the hydroxyaryl-ether radicals are o,o-di(t-butyl)-p-hydroxyphenylether radicals and o,o-di(t-butyl) - p-hydroxyphenylmethylene ether radicals. Illustrative of the hydroxyarylthioether radicals is the o,o-di(t-butyl) - p-hydroxyphenylthioether radical, etc.

Illustrative of specific radicals represented by R" of Formula 1 are, for example:

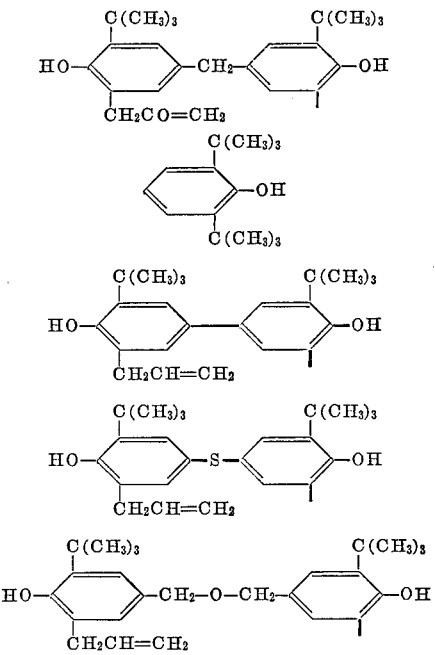

The nature of the compositions within the scope of the present invention is best understood by reference to the preparation of the composition which contain the silicon-bonded t-butyl-substituted hydroxylpropyl radical. The general method of preparation involves a starting material which contains a phenyl nucleus containing a nuclear carbo-bonded hydroxyl group and tertiary butyl radical in both of the meta positions of such phenolic compound. One or more of the nuclear-bonded t-butyl radicals is replaced by an allyl radical to produce an allyl-substituted material having the formula:

$$R'CH_2CH=CH_2$$

where R' is as previously defined. The allyl radical of this material is then reacted with an organopolysiloxane containing silicon-hydrogen linkages so as to attach the phenyl nucleus to the silicon atom through the propylene radical.

As a general illustration of this method, a commercial phenolic compound having the formula:

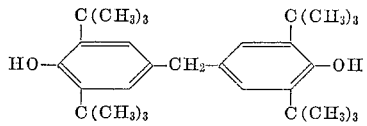

is dissolved in a mixture of toluene and ethanol and then an ethanol solution of potassium hydroxide is added to the solution. This results in the conversion of the phenol to the potassium phenylate. An amount of allyl chloride in ethanol sufficient to replace one tertiary butyl radical from each molecule is slowly added, the mixture is refluxed, salts are filtered, the product is washed and stripped to produce the allylated product having the formula:

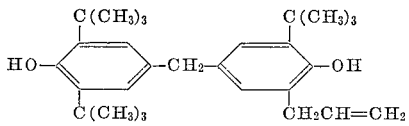

The allylated product is then reacted with the silicon hydrogen-containing polysiloxane in the presence of a platinum compound catalyst to produce the desired product.

In addition to the above described components, additives normally present in silicone greases can be present in the composition of the present invention. Examples of additives include antioxidants such as the amines, e.g., N-phenyl-alpha-naphthylamine; corrosion inhibitors, e.g., zinc naphthanate, extreme pressure additives such as selenium disulfide, molybdenum disulfide, etc.

The preparation of the polysiloxanes within the scope of Formula 1 involves an SiH-olefin addition reaction. This reaction simply involves the addition of an alpha-olefin having from 6 to 12 carbon atoms, and optionally one of the allylated R' radicals to some type of methylhydrogenpolysiloxane. For example, the preparation of a trimethylsilyl chain-stopped methyl higher alkylpolysiloxanes of Formula 1 involves the reaction between a methylhydrogenpolysiloxane having the formula:

(3) $(CH_3)_n(H)_{m+p}(R'')_qSiO_{\frac{4-m-n-p-q}{2}}$ where $n$, $m$, $p$, $q$ and R'' are as above defined, and an alpha-olefin. The reaction of the alpha-olefin and the polysiloxane of Formula 3 can take place in the presence of one of the elemental platinum or platinum compound catalyst can be selected from that group of platinum compound catalysts which are operative to catalyze the addition of silicon-hydrogen bonds across olefinic bonds.

Among the many useful catalysts for this addition reaction are chloroplatinic acid as described in U.S. Pat. 2,823,218—Speier et al., the reaction product of chloroplatinic acid with either an alcohol, an ether or an aldehyde as described in U.S. Pat. 3,220,972—Lamoreaux, trimethylplatinum iodide and hexamethyldiplatinum as described in U.S. Pat. 3,313,773—Lamoreaux, the platinum olefin complex catalysts as described in U.S. Pat. 3,159,601 of Ashby and the platinum cyclopropane complex catalyst as described in U.S. Pat. 3,159,662 of Ashby.

The SiH-olefin addition reaction may be run at room temperature or at temperatures up to 200° C., depending upon catalyst concentration. The catalyst concentration can vary from $10^{-7}$ to $10^{-3}$ and preferably $10^{-5}$ to $10^{-4}$ moles of platinum as metal per mole of olefin containing molecules present. Generally, the methylhydrogenpolysiloxane is mixed with a portion of the alpha-olefin, all of the catalyst is added, and then the remaining alpha-olefin is added at a rate sufficient to maintain the reaction temperature in the neighborhood of from about 50 to 120° C. and, at the end of the addition of the alpha-olefin, the reaction is completed.

The addition reaction is effected by adding to the methylhydrogen polysiloxane a platinum catalyst of one of the types previously described and then one of the allylated materials previously described is slowly added to the reaction mixture at a rate sufficient to maintain the reaction mixture at the desired reaction temperature, which is usually of the order of 50 to 120° C. The amount of the allylated material added to the reaction mixture is the amount which it is desired to react with the SiH-containing polysiloxane. The allylated compound is added in the ratio of from 0 to 0.5 molecule for every silicon-bonded hydrogen atom of the methylhydrogenpolysiloxane. This results in the conversion of each siloxane unit reacted, from a methylhydrogen siloxane unit to a siloxane unit containing one silicon-bonded methyl radical and one silicon-bonded t-butyl-substituted hydroxyarylpropyl radical. The appropriate amount of alpha-olefin is then added and reacted via the aforedescribed SiH-olefin addition reaction.

When preparing a linear copolymer of the type described in Formula 1, the general procedure as described earlier is followed. The methylhydrogenpolysiloxane is first reacted with the appropriate amount of the allylated material and then the appropriate amount of alpha-olefin is added. For example, when it is desired to produce a product within the scope of Formula 1 in which $n$ is 1.1, $m$ is 0.925, $p$ is 0.025, and $q$ is 0, the starting material can be a trimethylsilyl chain-stopped methylhydrogenpolysiloxane containing an average of 38 methylhydrogensiloxane units per molecule. One mole of this methylhydrogenpolysiloxane is reacted with 1 mole of an allylated t-butyl-substituted phenol, such as the product shown in the formula:

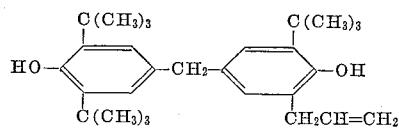

to produce a trimethylsilyl chain-stopped copolymer in which the average molecule contains 37 methylhydrogensiloxane units and 1 unit in which the R' is the radical shown in the formula:

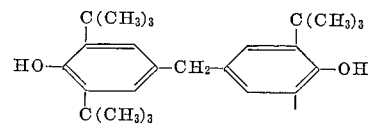

Then one mole of the resulting copolymer is reacted with 37 moles of an appropriate alpha-olefin, such as decene-1, according to the method previously described, to produce a copolymer within the scope of Formula 1 in which $n$ is 1.1, $m$ is 0.925, $p$ is 0.025 and $q$ is 0.

The following examples are illustrative of the practice of my invention and are not intended for purposes of limitation. All parts are by weight unless otherwise indicated.

EXAMPLE 1

An allylated product of the formula:

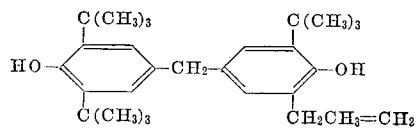

was prepared by dissolving 424 g. (1 mole) of 4,4'-methylene-bis-2,6-ditertiarybutylphenol in an equal weight of toluene and an equal weight of ethyl alcohol. One thousand grams of a solution containing 112 g. of potassium hydroxide in ethyl alcohol was made and slowly added to the phenol to provide the stoichiometric equivalent of the phenolic hydroxyl groups. A brilliant purple solution resulted which, when dried, showed no evidence of phenol and tested completely for complete conversion to the potassium phenylate. An additional equivalent amount of ethyl alcohol was added and 1.5 moles of allyl chloride was slowly introduced to the reaction mixture, which was refluxed for 2 hours at 70° C. All solids were filtered from the reaction mixture and the product was washed and stripped. Infrared analysis showed that the phenolate had been converted to phenol and that the allyl group was in place. Nuclear magnetic resonance evidence pointed to a replacement of one tertiary butyl group on one of the two aryl radicals by an allyl radical.

To a reaction vessel was added 300 g. of a liquid trimethylsilyl chain-stopped methylhydrogenpolysiloxane of the formula:

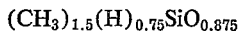

To this mixture was added 0.00125 gram of chloroplatinic acid hexahydrate and 28.8 grams of the allylated product over a period of 0.5 hour, while the temperature of the reaction mixture was maintained at 110° C. External heating was discontinued. Then 500 grams of decene-1 was added slowly to the reaction mixture over a one hour period, during which time the temperature was maintained at 110° C. by the exothermic reaction resulting from the addition. After complete addition of the decene-1, heat was applied to the flask to maintain temperature at 110° C. for an additional 30 minutes to insure that all ≡SiH is totally reacted and then the reaction product was vacuum stripped at 282° C. and 10 mm. Hg using a nitrogen purge. This resulted in a base oil within the scope of Formula 1 in which R is decyl, R' is a radical of the formula:

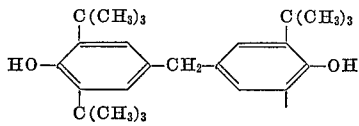

$n$ has a value of 1.5, $m$ has a value of .734 and $p$ has a value of 0.016. Since there are fewer than one of the t-butyl hydroxyarylpropyl-substituted silicon atoms per 8 silicon atoms and the polysiloxane contains 8 silicon atoms per molecule, it is apparent that the compositions of the present invention comprise a blend of products within the scope of Formula 1, some of which contain the internal antioxidant radical and some of which do not.

To 36 grams of the base oil and 18 grams of lithium myristate in a grease kettle were added 0.75 grams of a polyether of the formula:

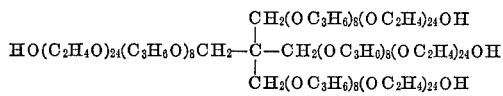

and 0.01 gram of finely divided lithium hydroxide. The mixture was stirred and heated to 240° C. The mixture was maintained at 240° C. for 10 minutes with stirring. The mixture was then slowly cooled at a rate of 1.4° C. per minute to 150° C. at which temperature 0.45 gram of N-phenyl-alpha-naphthylamine, 0.1 gram of finely divided lithium hydroxide, 36 grams of the base oil and 7 grams of lithium myristate were added. The slow cooling was continued to room temperature. The mixture was then milled three times through a Morehouse colloid mill set at 3 mils clearance. The resulting material was a light grade (290–330 Penetration) grease with the following properties:

Penetration—296
Bleed 24 hours at 150° C.—7.8%
Evaporation 24 hours at 150° C.—1.4%
Appearance—Smooth grease, purple in color The grease was used to lubricate the oscillating recording mechanism in a chart recorder and was still functioning perfectly after 6 months of continuous use. Under identical conditions a commercial petroleum grease failed after 2 weeks.

A windshield wiper mechanism consisting of a cam operating in a housing was lubricated with the grease of the present example and operated for 6 months with no difficulty. The same mechanism lubricated with petroleum grease failed after 200 hours. A result similar to that achieved with the petroleum grease was achieved using a conventional silicone grease.

EXAMPLE 2

To a reaction vessel was added 300 g. of a liquid trimethylsilyl chain-stopped methylhydrogenpolysiloxane of the formula:

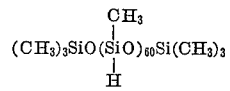

To this mixture was added 0.00125 gram of chloroplatinic acid hexahydrate and 28.8 grams of the allylated product described in Example 1 over a period of 0.5 hour, while the temperature of the reaction mixture was maintained at 110° C. Heating was discontinued. Then 683 grams of decene-1 was added slowly to the reaction mixture over a one hour period, during which time the temperature was maintained at 110° C. by the exothermic reaction resulting from the addition. After complete addition of the decene-1, heat was applied to the flask to maintain the temperature at 110° C. for an additional 30 minutes to insure that all ≡SiH was totally reacted and then the reaction product was vacuum stripped at 282° C. and 10 mm. Hg using a nitrogen purge. This resulted in a base oil within the scope of Formula 1 where R is decyl, R' is a radical of the formula:

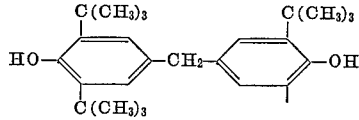

$n$ has a value of 1.065, $m$ has a value of 0.953 and $p$ has a value of 0.0148. Since $p$, the ratio of the t-butylhydroxyaryl radicals to silicon atoms is less than one in 62, and there are 62 silicon atoms per polysiloxane molecule, it is apparent that the compositions of the present invention comprise a blend of products within the scope of Formula 1 in which the majority of the polysiloxane molecules contain one R' radical and a minor of the polysiloxane molecules which do not contain an R' radical.

To 36 grams of the base oil and 18 grams of lithium myristate in a grease kettle were added 0.75 gram of a polyether of the formula:

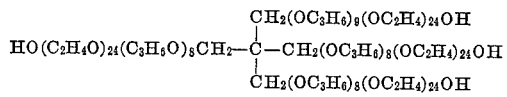

and 0.01 gram of finely divided lithium hydroxide. The mixture was stirred and heated to 240° C. The mixture was maintained at 240° C. for 10 minutes with stirring. The mixture was then slowly cooled at a rate of 1.4° C per minute to 150° C at which temperature 0.45 gram of N-phenyl-alphanaphthylamine, 0.1 gram of finely divided lithium hydroxide, 36 grams of the base oil and 7 grams of lithium myristate were added. The slow cooling was continued to room temperature. The mixture was then milled three times through a Morehouse colloid mill set at 3 mils clearance. The resulting material was a light grade (290–330 Penetration) grease.

EXAMPLE 3

To a reaction vessel was added 300 g. of a liquid trimethylsilyl chain-stopped methylhydrogenpolysiloxane of the formula:

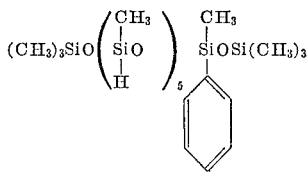

Over a period of 0.5 hour to this mixture was added 0.00125 gram of chloroplatinic acid hexahydrate and 28.8 grams of the allylated product described in Example 1 while the temperature of the reaction mixture was maintained at 110° C. Heating was discontinued and 440.0 grams of dodecene-1 was added slowly to the reaction mixture over a one hour period, during which time the temperature was maintained at 110° C. by the exothermic reaction resulting from the addition. After complete addition of the dodecene-1, heat was applied to the flask to maintain temperature at 110° C. for an additional 30 minutes to insure that all ≡SiH is totally reacted. The reation product was then vacuum stripped at 282° C. and 10 mm. Hg using a nitrogen purge. This resulted in a base oil within the scope of Formula 1 where R is dodecyl, R′ is a radical of the formula:

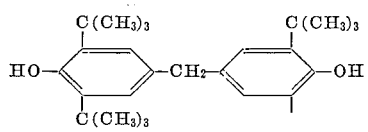

$n$ has a value of 1.5, $m$ has a value of 0.60, $p$ has a value of 0.0186 and $q$ has a value of 0.125. Since there is an average of only 0.146 inhibitor radicals per polysiloxane molecule it is apparent that the compositions of the present invention comprise a blend of products within the scope of Formula 1, some of which contain one inhibitor radical but the majority of which do not.

To 36 grams of the base oil and 18 grams of lithium myristrate in a grease kettle were added 0.75 gram of a polyether of the formula:

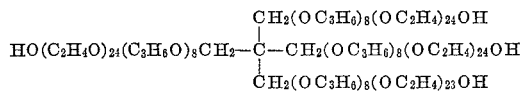

and 0.01 gram of finely divided lithium hydroxide. The mixture was stirred and heated to 240° C. The mixture was maintained at 240° C. for 10 minutes with stirring. The mixture was then slowly cooled at a rate of 1.4° C. per minute to 150° C. at which temperature 0.45 gram of N-phenyl-alpha-napthylamine, 0.1 gram of finely divided lithium hydroxide, 36 grams of the base oil and 7 grams of lithium myristate were added. The slow cooling was continued to room temperature. The mixture was then milled three times through a Morehouse colloid mill set at 3 mils clearance. The resulting material was a light grade (290–330 Penetration) grease.

EXAMPLE 4

To 880 grams of the base oil of Example 1 in a grease kettle were added 0.2 gram of a polyether of the formula:

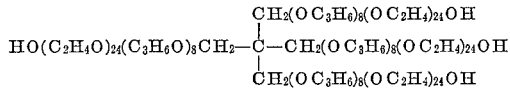

10.5 grams of a finely divided fumed silica, 0.5 gram of pentaerythritol and 0.8 gram of trimethoxyboroxine. The mixture was heated to 125° C. and maintained at 125° C. for 60 minutes with stirring. The mixture was cooled to room temperature. The mixture was then milled three times through a Morehouse colloid mill set at 3 mils clearance. The resulting material was a smooth semitransparent, yellow-brown grease having the following properties:

Penetration (worked 60x)—269
Bleed, 24 hours at 150° C.—3.72%
Evaporation, 24 hours at 150° C.—2.77%

EXAMPLE 5

To 100 grams of the base oil of Example 1, in a grease kettle were added 15 grams of finely divided carbon black, 1 gram of a polyether of the formula:

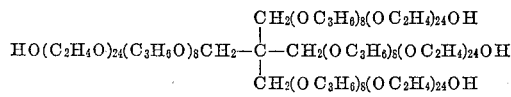

and 0.01 gram of finely divided lithium hydroxide. The mixture was stirred and heated to 125° C. The mixture was maintained at 125° C. for 60 minutes with stirring. The mixture was cooled to room temperature. The mixture was then milled three times through a Morehouse colloid mill set at 3 mils clearance. The resulting material was a light grade (290–330 Penetration) grease.

EXAMPLE 6

To 144 parts of the base oil of Example 1 was added 60 parts of finely divided graphite. The mixture was then milled three times through a Morehouse colloid mill set at 3 mils clearance. The resulting material was a soft, smooth, black grease with the following properties:

Penetration—365
Bleed, 24 hours at 150° C.—6.5%
Evaporation, 24 hours at 150° C.—.7%

While the foregoing examples have illustrated many of the variations in compositions possible within the scope of the present invention, it should be understood that this invention relates broadly to a silicone grease which has a good film forming ability when subject to low speed fluttering or oscillatory motion. It appears that the long chain alkyl groups present on the polysiloxane chain provide a bulking action which results in a thick film being present on surface layers subject to oscillatory or fluttering motion. In addition, the greases of the present invention are also quite useful where water washout is a problem, for example, the mechanism of windshield wipers. The present day windshield wiper mechanism often runs in and sometimes even under water and the bearing surfaces of such mechanisms must be lubricated with a grease which is not subject to water washout. The greases of the present invention fulfill this requirement admirably. The water washout resistance of the greases of the present invention together with their ability to withstand oscillatory or fluttering motion makes them ideally suited for this application.

What I claim as new and desire to secure by Letters Patent of the United States is:

1. A silicone grease composition having improved film forming properties when subjected to oscillatory or fluttering motion, comprising on a weight basis:

(1) from about 61% to about 98% based upon the weight of the grease of a polysiloxane fluid having a viscosity of about 10 centistokes to about 100,000 centistokes of the formula:

(1) 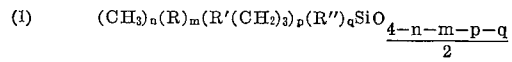

where the sum of $(m+n+p+q)$ has a value of from 2.002 to 3.0, $n$ has a value of from .50 to 1.95, $m$ has a value of from 0.5 to 1.0, $p$ has a value of from 0 to 0.5, $q$ has a value of from 0 to ¼ $(m+n+p)$, R is an alkyl radical containing from 6 to 12 carbon atoms; R′ is a t-butyl substituted hindered hydroxyaryl radical; R″ is selected from the class consisting of lower alkyl radicals, cycloalkyl radicals having 5 to 7 carbon atoms in the ring, mononuclear and binuclear aryl radicals, mononuclear aryl lower alkyl radicals, and halogenated derivatives of the above radicals;

(2) from about 2% to about 35% by weight based upon the weight of the grease of a thickener;

(3) from about 0.01% to about 5% based upon the weight of the polysiloxane fluid of a polyether selected from the formulas consisting of, $$A\text{—}O\text{—}(C_xH_{2x}O)_n\text{—}B$$

and $$(A\text{—}O\text{—}(C_xH_{2x}O)_n\text{—})_y(Q)_z$$

wherein A and B represent radicals selected from the class consisting of hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

$$R\text{—}\overset{\overset{\displaystyle O}{\|}}{C}\text{—}O$$

wherein R is alkyl containing from 1 to 11 carbon atoms; Q is a residue of a polyhydric initator radical containing at least two hydroxyl radicals selected from the class consisting of ethylene glycol, glycerol, trimethylolpropane, and other polyhydric alcohols having from 2 to 6 hydroxyl groups; $n$ is a number having a value of from 4 to 2000; $x$ is a number having a value of 2 to 4; $y$ has a value of from 2 to 10; and $z$ has a value of from 1 to 5; the polyether having a molecular weight of from about 300 to about 200,000;

(4) a sufficient amount of a metal base to maintain the grease in an alkaline condition.

2. The grease composition of claim 1, wherein:
(1) the R radical of the polysiloxane fluid contains 10 carbon atoms;
(2) the thickener is a lithium soap of a higher fatty acid having from 12 to 22 non-carboxyl carbon atoms;
(3) from about 0.1 to about 2% of the polyether is employed;
(4) lithium hydroxide is used to maintain the grease on the alkaline side.

3. The grease composition of claim 1, wherein:
(1) the R radical of the polysiloxane fluid contains 10 carbon atoms; and
(2) the thickener is selected from the class consisting of lithium laurate, lithium myristate, lithium palmitate, and lithium stearate.

4. The grease composition of claim 1, wherein:
(1) the R radical of the polysiloxane fluid is an alkyl radical containing from 8 to 12 carbon atoms;
(2) the thickener is selected from the class consisting of lithium myristate and lithium stearate.

5. The grease composition of claim 1, wherein the thickener is lithium myristate.

References Cited

UNITED STATES PATENTS

| | | | |
|---|---|---|---|
| 2,677,658 | 5/1954 | Bidand | 252—28 |
| 2,680,095 | 6/1954 | Hotten | 252—42.1 |
| 2,684,944 | 7/1954 | Zajac | 252—42.1 |
| 2,877,182 | 3/1959 | Midland | 252—29 |

FOREIGN PATENTS

| | | |
|---|---|---|
| 778,468 | 7/1957 | Great Britain. |
| 778,822 | 7/1957 | Great Britain. |

PATRICK P. GARVIN, Primary Examiner

I. VAUGHN, Assistant Examiner

U.S. Cl. X.R.

252—28, 29, 30, 49.6